BEST AVAILABLE COPY
2 Sheets—Sheet 1.
B. CUSHWA.
Circular Saw Mill.
No. 46.
A. I. Patented June 19, 1841.
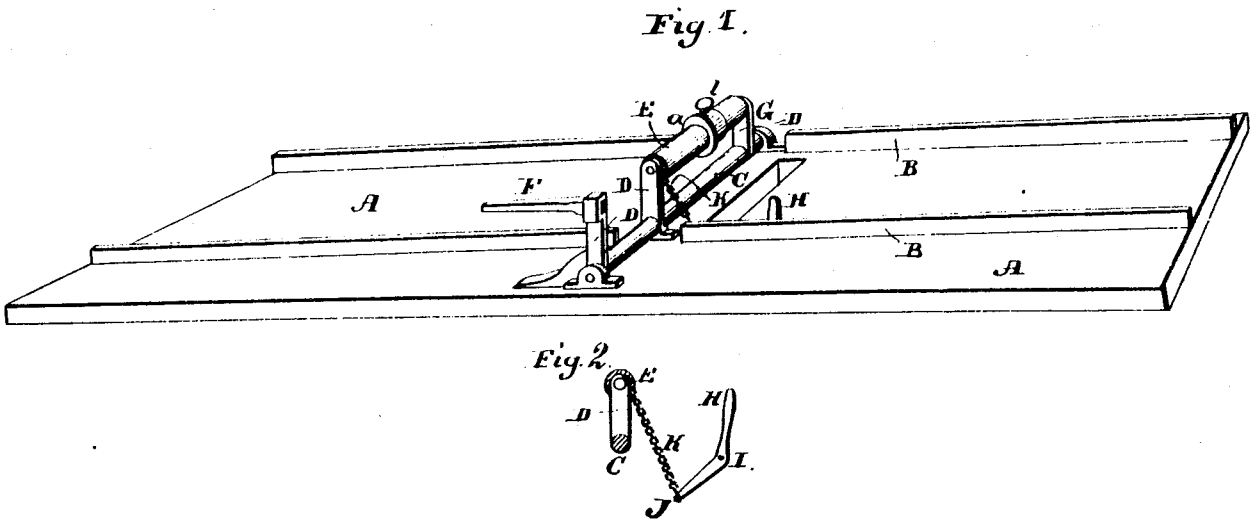
N. PETERS, Photo-Lithographer, Washington, D. C.

BEST AVAILABLE COPY
2 Sheets—Sheet 2.
B. CUSHWA.
Circular Saw Mill.
No. 46. A. I. Patented June 19, 1841.
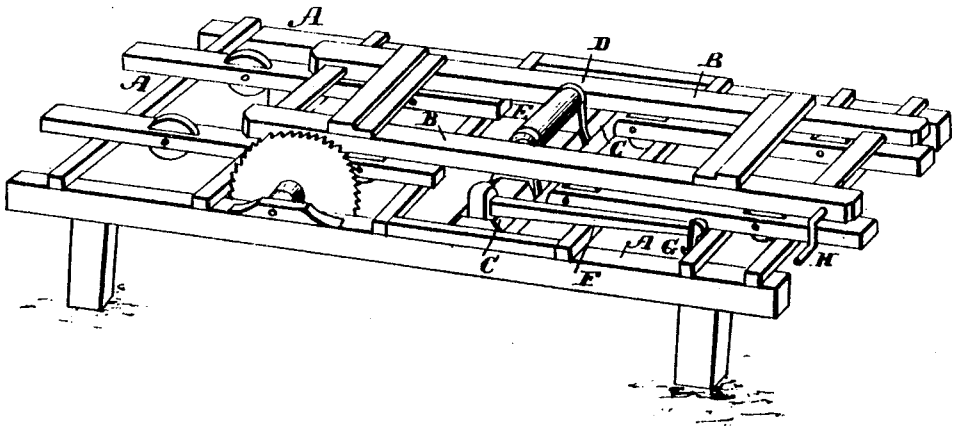
N. PETERS, Photo-Lithographer, Washington, D.C.